United States Patent
Toillon et al.

(10) Patent No.: US 10,805,108 B2
(45) Date of Patent: Oct. 13, 2020

(54) COMMUNICATION SYSTEM AND METHOD FOR CONTROLLING AND MONITORING AT LEAST ONE PERIPHERAL

(71) Applicant: SAFRAN ELECTRONICS & DEFENSE, Boulogne Billancourt (FR)

(72) Inventors: Patrice Toillon, Boulogne Billancourt (FR); Albert Auphan, Boulogne Billancourt (FR); Martin Wendling, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 16/627,063

(22) PCT Filed: Jul. 9, 2018

(86) PCT No.: PCT/EP2018/068496
§ 371 (c)(1),
(2) Date: Dec. 27, 2019

(87) PCT Pub. No.: WO2019/011836
PCT Pub. Date: Jan. 17, 2019

(65) Prior Publication Data
US 2020/0186387 A1 Jun. 11, 2020

(30) Foreign Application Priority Data
Jul. 12, 2017 (FR) ...................... 17 56613

(51) Int. Cl.
*H04L 1/00* (2006.01)
*H04L 12/403* (2006.01)
(Continued)

(52) U.S. Cl.
CPC .......... *H04L 12/4035* (2013.01); *G06F 13/42* (2013.01); *H04L 12/40169* (2013.01);
(Continued)

(58) Field of Classification Search
CPC .. G05B 19/042; G05B 19/0423; G05B 19/05; G05B 19/052; G05B 19/054;
(Continued)

(56) References Cited

U.S. PATENT DOCUMENTS 5,694,542 A * 12/1997 Kopetz ................... G06F 11/10
714/47.1
6,145,008 A * 11/2000 Kopetz ................. G06F 13/387
370/476

(Continued)

FOREIGN PATENT DOCUMENTS

EP 2320603 A1 5/2011
FR 2982443 A1 5/2013

OTHER PUBLICATIONS

Mifdaoui et al, Performance Analysis of a Master/Slave Switched Ethernet for Military Embedded Applications, IEEE, 14 pages, Nov. 2010.*

(Continued)

*Primary Examiner* — Frank Duong
(74) *Attorney, Agent, or Firm* — Oliff PLC; R. Brian Drozd

(57) ABSTRACT

Systems and methods are provided for controlling and monitoring a peripheral in an aircraft that includes a master module connected to each slave module. Each slave module is disposed around a controlled peripheral and is connected to a port of the master module by a bidirectional link. The master module sends data frames comprising the value of a counter. Each slave module reads the value of the counter included in the data frame received, updates a counter with the value read, checks whether the value of the updated counter corresponds to a time-period index associated with the slave module and if so transfers a data frame to the master module. The master module selects, from a table comprising time period indices and identifiers, the port (Continued)

connecting the master module to the slave module the identifier of which is associated with the time-period index that corresponds to the counter's value.

10 Claims, 7 Drawing Sheets

(51) Int. Cl.
  *G06F 13/42* (2006.01)
  *H04L 12/40* (2006.01)
  *H04L 29/08* (2006.01)
  *H04L 29/06* (2006.01)
  *H04W 84/20* (2009.01)

(52) U.S. Cl.
  CPC .............. *H04L 67/12* (2013.01); *H04L 69/28* (2013.01); *H04W 84/20* (2013.01); *H04L 2012/4028* (2013.01)

(58) Field of Classification Search
  CPC .... G05B 2219/1101; G05B 2219/1215; G05B 2219/25012; G05B 2219/25479; G06F 13/14; G06F 13/42; H04B 7/26; H04L 12/40; H04L 12/403; H04L 12/40169; H04L 2/4035; H04L 29/06; H04L 29/08; H04L 67/10; H04L 67/12; H04L 69/28; H04L 2012/4028; H04W 84/20
  See application file for complete search history.

(56) References Cited

U.S. PATENT DOCUMENTS

| | | | |
|---|---|---|---|
| 7,486,693 B2* | 2/2009 | Walter | H04L 12/4035 370/437 |
| 9,398,080 B2* | 7/2016 | Mizutani | H04L 67/10 |
| 2003/0115369 A1 | 6/2003 | Walter et al. | |
| 2012/0233359 A1* | 9/2012 | Einig | G06F 11/2038 710/16 |

OTHER PUBLICATIONS

Wei et al, Exploiting Real-time Switched Ethernet for Enhanced Network Recovery Scheme in Naval Combat System, IEEE, 6 pages, 2014.*
Sep. 4, 2018 International Search Report issued in International Patent Application No. PCT/EP2018/068496.
Sep. 17, 2018 Written Opinion issued in International Patent Application No. PCT/EP2018/068496.

\* cited by examiner

Fig. 4a

| | MRCL₁ | | | | | | MRCL₂ | | | | | |
|---|---|---|---|---|---|---|---|---|---|---|---|---|
| 100 | TX | TX | TX | TX | TX | TX | TX | TX | TX | TX | TX | TX |
| 120₁ | | TX | | | | | | TX | | | | |
| 120₂ | TX | | | | | TX | | | | | | |
| 120_{N-1} | | | | TX | | | | | | | TX | |
| 120_N | | | | | TX | | | | | | | TX |
| | EC₁ | EC₂ | | | EC_{M-1} | EC_M | EC₁ | EC₂ | | | EC_{M-1} | EC_M |

| | MRCL₁ | | | | | | MRCL₂ | | | | | |
|---|---|---|---|---|---|---|---|---|---|---|---|---|
| 100 | TX | TX | TX | TX | TX | | TX | TX | TX | TX | TX | |
| 120₁ | TX | | | | | | TX | | | TX | | |
| 120₂ | | TX | | | | | | TX | | | | |
| 120_{N-1} | | | TX | | | | | | | | | |
| 120_N | | | | | | TX | | | | | | TX |
| | EC₁ | EC₂ | EC₃ | EC_{M-2} | EC_{M-1} | EC_M | EC₁ | EC₂ | EC₃ | EC_{M-2} | EC_{M-1} | EC_M |

Fig. 4b

COMMUNICATION SYSTEM AND METHOD FOR CONTROLLING AND MONITORING AT LEAST ONE PERIPHERAL

The present invention relates to a communication method and system for controlling and monitoring at least one peripheral in an aircraft. Conventionally, the electronics for controlling and monitoring a peripheral such as, for example, a power switch, a static converter, an actuator or an electric motor, for example used in the braking system of an aircraft, are situated close to the peripheral.

This proximity between the control and monitoring electronics and the peripheral guarantees good reception of the control and monitoring signals, and avoids any problem related to any signal propagation times or any losses of synchronisation between separate devices, distant or not.

There exists at the present time a need to centralise the electronics controlling and monitoring the peripherals that minimises synchronisation losses and is robust with regard to any loss of synchronisation between the control and monitoring electronics and the electronics placed close to the peripherals. Existing communication networks are not suited to the requirements related for example to the reaction time necessary for optimum monitoring and control of certain peripherals.

It is therefore necessary now to provide a communication system that allows centralisation of the electronics controlling peripherals and which is suited to real-time constraints for controlling and monitoring peripherals.

To this end, according to a first aspect, the invention proposes a communication system for controlling and monitoring at least one peripheral in an aircraft, the system comprising a master communication module connected to at least one separate slave communication module, distant or not from the master communication module, the or each slave communication module being disposed in the vicinity of a controlled peripheral and being connected to a port of the master communication module by a bidirectional link, characterised in that the system comprises:

a counter included in the master communication module, a table, included in the master communication module, the table comprising time-period indices, each time-period index being associated or not with an identifier of a slave communication module, means, included in the master communication module, for transmitting data frames to the or each slave communication module in a plurality of time periods, each data frame comprising the value of the counter, means, included in the or each slave communication module, for receiving the data frames, means, included in the or each slave communication module, for reading the value of the counter included in the data frame received, and for updating a counter included in the or each slave communication module with the read value of the counter included in the data frame received, means, included in the or each slave communication module, for checking whether the value of the counter updated corresponds to a time-period index associated with the slave communication module, means, included in the or each slave communication module, for transferring a data frame to the master communication module if the value of the counter read and stored corresponds to a time-period index associated with the slave communication module, means, included in the master communication module, for selecting the port connecting the master communication module to the slave communication module the identifier of which is associated with the time-period index that corresponds to the value of the counter, means, included in the master communication module, for receiving the data frame transmitted by the slave communication module.

The invention also relates to a communication method for controlling and monitoring at least one peripheral in an aircraft, the system comprising a master communication module connected to the or each separate slave communication module, distant or not from the master communication module, the or each slave communication module being disposed in the vicinity of a controlled peripheral and being connected to a port of the master communication module by a bidirectional link, characterised in that the method comprises the steps of:

sending, by the master communication module, of data frames to the or each slave communication module in a plurality of time periods, each data frame comprising the value of a counter included in the master communication module, receiving of the data frames by the or each slave communication module, reading, by the or each slave communication module, of the value of the counter included in the data frame received, and the updating, by the or each slave communication module, of a counter included in the or each slave communication module with the read value of the counter included in the data frame received, checking, by the or each slave communication module, whether the value of the counter updated corresponds to a time-period index associated with the slave communication module, transferring of a data frame by the or each slave communication module to the master communication module if the value of the counter read and stored corresponds to a time-period index associated with the slave communication module, selecting, by the master communication module, from a table, included in the master communication module, comprising time-period indices, each time-period index being associated or not with an identifier of a slave communication module, of the port connecting the master communication module to the slave communication module the identifier of which is associated with the time-period index that corresponds to the value of the counter.

Thus the communication system according to the present invention allows centralisation of the electronics controlling peripherals and is suited to the synchronisation constraints between the master communication module and the or each slave communication module, in real time for controlling and monitoring one or more peripherals.

By using the value of the counter included in each data frame transmitted by the master communication module for updating the value of a counter included in the or each slave communication module, the or each slave communication module can remain synchronised with the master communication module.

In addition the present invention facilitates the coordinated management of separate peripherals, distant or not, with mastery of the time coherence in the control of a plurality of peripherals.

The present invention limits the electronics offset in the vicinity of a peripheral, and consequently the volume thereof in the zone where the or each peripheral is situated, which is sometimes subject to strict environmental constraints, such as for example mechanical and/or thermal constraints. The present invention makes it possible to concentrate part of the electronics in a zone where the environmental constraints are lesser and which is more accessible.

According to a particular embodiment of the invention, the master communication module is connected to a plurality of slave communication modules, the port and the bidirectional link connecting each slave communication module to the master communication module being different from the port and the bidirectional link connecting each other slave communication module to the master communication module.

Thus the present invention, by using different ports and links for the slave communication modules, guarantees the independence of the links and, when a problem appears for a link, prevents this from interfering with the control and monitoring of the other peripherals.

In addition, the present invention, by using different ports and links for the slave communication modules, improves the mastery of the latency between the master communication device and the slave communication device.

According to a particular embodiment of the invention, at least two slave communication modules are connected to the master communication module and at least one slave communication module is connected to the master communication module via another slave communication module and the port and the bidirectional link connecting the other slave communication module to the master communication module.

Thus the present invention makes it possible to reduce the lengths of certain links.

According to a particular embodiment of the invention, the other slave communication module comprises means for transmitting the data frame to the slave communication module that is connected to it.

Thus the present invention guarantees that the data frames are correctly transmitted to the slave communication module that is connected to it.

According to a particular embodiment of the invention, the system further comprises a supervision module that stores each data frame transmitted by the master communication module and by each slave communication module.

Thus the present invention makes it possible to monitor part or all of the traffic present in the communication system with an objective of checking the integrity and coherence of the information exchanged.

According to a particular embodiment of the invention, the supervision module receives each data frame from the master communication module.

Thus the number of connections is limited.

According to a particular embodiment of the invention, the supervision module receives from the master communication module each data frame transmitted by the master communication module to the or each slave communication module and receives each data frame transmitted by each slave communication module to the master communication module of the slave communication modules.

Thus the present invention makes it possible to monitor the traffic present in the communication system in real time.

According to a particular embodiment of the invention, the master communication module is broken down into two parts, each part comprising a port connecting them together.

Thus the present invention, by separating the communication functions of the master communication module, limits the impact of the number of ports to which the slave communication modules are connected to only one of the parts.

According to a particular embodiment of the invention, the two parts are placed at different points and the ports are connected by a link.

Thus the present invention makes it possible to place the part that comprises the ports to which the slave communication modules are connected closer to the slave communication modules and thus to reduce the cabling.

The invention also relates to the computer programs stored on an information carrier, said programs comprising instructions for implementing the previously described methods, when they are loaded into and executed by a computer system.

The features of the invention mentioned above, as well as others, will emerge more clearly from a reading of the following description of an example embodiment, said description being given in relation to the accompanying drawings, among which:

FIG. 4a depicts a first example of a timing diagram for the transmission of frames by the master communication module and slave communication modules;

FIG. 4b depicts a second example of a timing diagram for the transmission of data frames by the master communication module and slave communication modules;

Figure 1A:
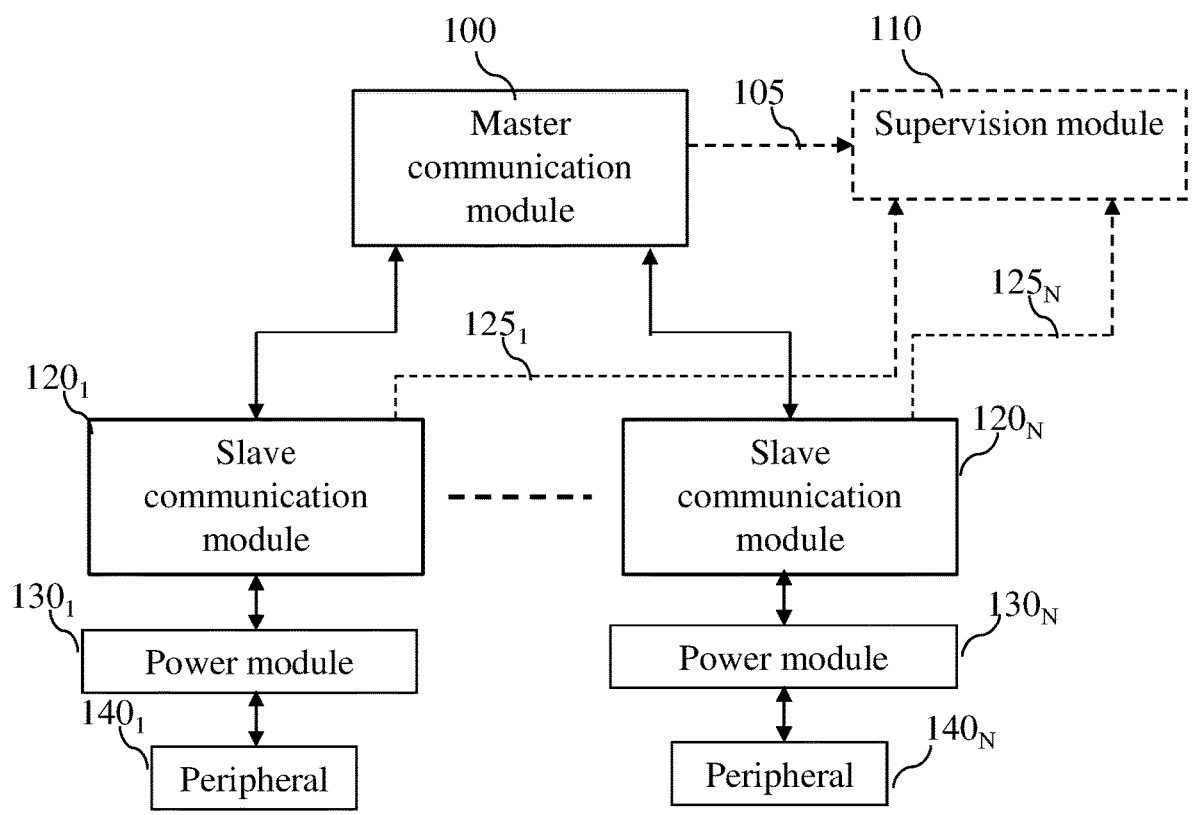
FIG. 1a depicts a first example of architecture of a communication system for the control and monitoring of peripherals according to the present invention.

The communication system according to the present invention comprises a master communication module 100 that is connected to at least one slave communication module. In the example in FIG. 1a, the master communication module 100 is connected to a plurality of slave communication modules $120_1$ to $120_N$ where N is greater than 2.

Each communication module $120_1$ to $120_N$ is connected to a port of the master communication module by a bidirectional link. The bidirectional link and the port are different from each port and each bidirectional link connecting each other slave communication module to the master communication module 100.

The bidirectional links are for example 100Base-T Ethernet cables in accordance with the ARINC 664 P2 standard and have for example a length of around 10 to 20 metres.

Each slave communication module $120_1$ to $120_N$ is connected respectively to a power module $130_1$ to $130_N$ itself connected to a peripheral $140_1$ to $140_N$ to be monitored.

Each slave communication module $120_1$ to $120_N$ is placed close to the power module and peripheral $140_1$ to $140_N$ that it monitors and controls.

When the master communication module 100 transmits a data frame, the latter is transmitted to each slave communication module $120_1$ to $120_N$.

The communication system optionally comprises a supervision module 110.

The supervision module 110 receives and stores and can monitor each data frame transmitted by the master communication module 100 and the slave communication modules $120_1$ to $120_N$.

For example, the data are used subsequently for maintenance, a posteriori analysis or real-time monitoring operations.

According to a particular embodiment, the supervision module 110 receives, from the master communication module 100, the data frames transmitted by the master communication module 100 and the slave communication modules $120_1$ to $120_N$ by means of one or more links denoted 105.

According to another particular embodiment, the supervision module 110 receives the data frames transmitted by the master communication module 100 to the slave communication modules by means of the link 105 and receives the data frames transmitted by the slave communication modules $120_1$ to $120_N$ respectively by means of the links $125_1$ to $125_N$.

Figure 1B:
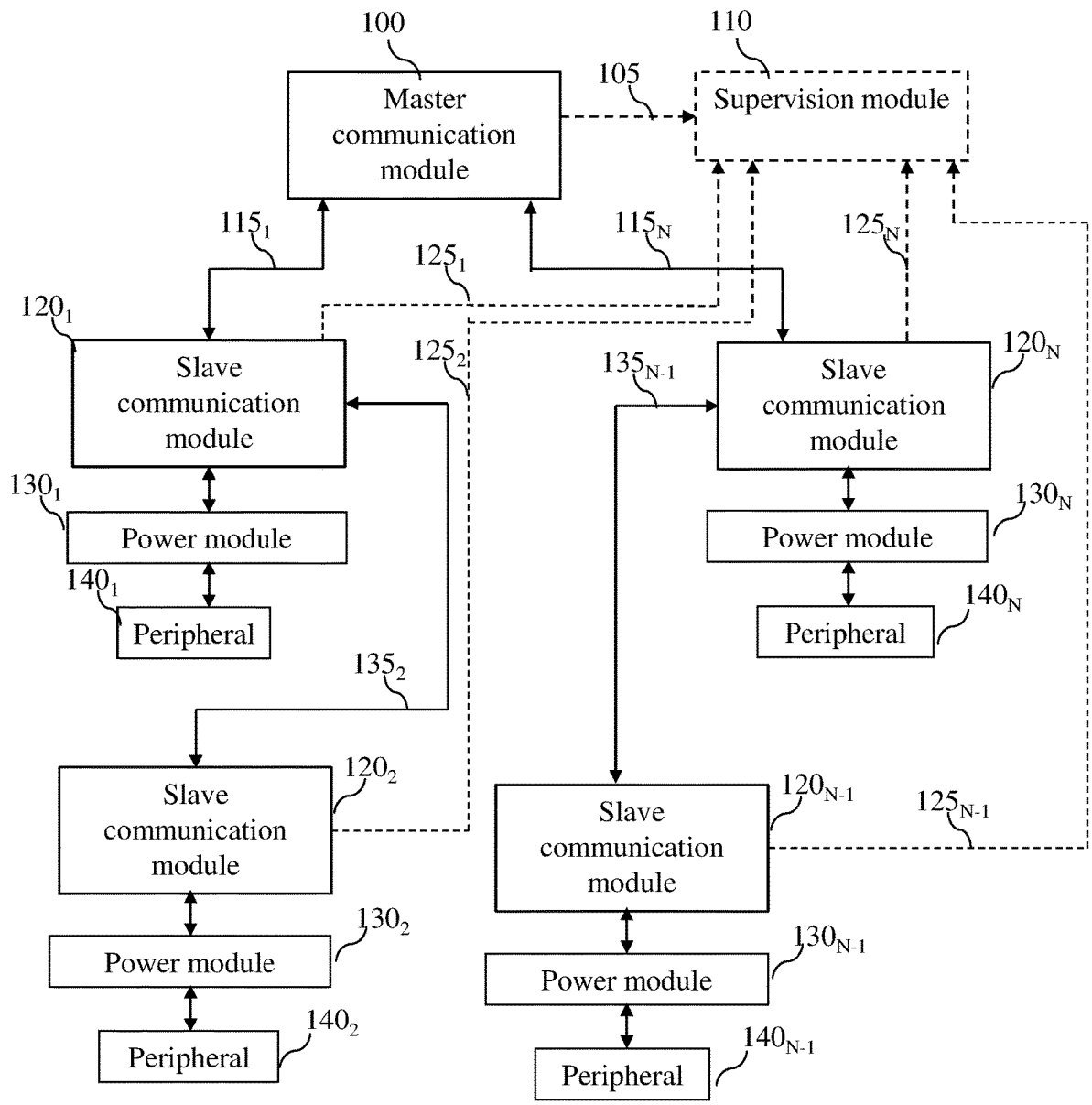
FIG. 1b depicts a second example of architecture of a communication system for the control and monitoring of peripherals according to the present invention.

FIG. 1b depicts a second example of architecture of a communication system for the control and monitoring of peripherals according to the present invention.

The communication system according to the present invention comprises a master communication module 100 that is connected to at least one slave communication module. In the example in FIG. 1b, the master communication module 100 is connected to a plurality of slave communication modules $120_1$ to $120_N$.

According to the second example, at least three slave communication modules are connected to the master communication module and at least one slave communication module is connected to the master communication module via another slave communication module.

The slave communication module $120_1$ is connected to the master communication module 100 by the bidirectional link $115_1$ and the slave communication module $120_N$ is connected to the master communication module 100 by the bidirectional link $115_N$.

The slave communication module $120_2$ is connected to the master communication module 100 by the bidirectional link $135_2$, via the slave communication module $120_1$ and the bidirectional link $115_1$.

The slave communication module $120_{N-1}$ is connected to the master communication module 100 by the bidirectional link $135_{N-1}$, via the slave communication module $120_N$ and the bidirectional link $115_N$.

The bidirectional links are for example 100Base-T Ethernet cables in accordance with the ARINC 664 P2 standard and have for example a length of around 10 to 20 metres.

Each slave communication module $120_1, 120_2 \ldots 120_{N-1}, 120_N$ is connected respectively to a power module $130_1, 130_2 \ldots 130_{N-1}, 130_N$ itself connected to a peripheral to be monitored $140_1, 140_2 \ldots 140_{N-1}, 140_N$.

Each slave communication module $120_1, 120_2 \ldots 120_{N-1}, 120_N$ is placed in the vicinity of the power module $130_1, 130_2 \ldots 130_{N-1}, 130_N$ and of the periphery $140_1, 140_2 \ldots 140_{N-1}, 140_N$ that it monitors and controls.

When the master communication module 100 transmits a data frame, the latter is broadcast to each slave communication module $120_1, 120_2 \ldots 120_{N-1}, 120_N$.

The communication system optionally comprises a supervision module 110.

The supervision module 110 receives and stores each data frame transmitted by the master communication module 100 and the slave communication modules $120_1, 120_2 \ldots 120_{N-1}, 120_N$.

For example, the data are used subsequently for maintenance, a posteriori analysis or real-time monitoring operations.

According to a particular embodiment, the supervision module 110 receives, from the master communication module 100, the data frames transmitted by the master communication module 100 and the slave communication modules $120_1, 120_2 \ldots 120_{N-1}, 120_N$ by means of one or more links denoted 105.

According to another particular embodiment, the supervision module 110 receives the data frames transmitted by the master communication module 100 to the slave communication modules $120_1, 120_2 \ldots 120_{N-1}, 120_N$ by means of the link 105, receives the data frames transmitted by the slave communication modules $120_1$ and $120_2$ by means of the link $125_1$ and receives the data frames transmitted by the slave communication modules $120_{N-1}$ and $120_N$ by means of the link $125_N$.

According to another particular embodiment, the supervision module 110 receives, from the master communication module 100, the data frames transmitted by the master communication module 100 to the slave communication modules $120_1, 120_2 \ldots 120_{N-1}, 120_N$ by means of the link 105, and receives the data frames transmitted by the slave communication modules $120_1, 120_2 \ldots 120_{N-1}, 120_N$ respectively by means of the links $125_1, 125_2 \ldots 125_{N-1}, 125_N$.

Figure 2A:
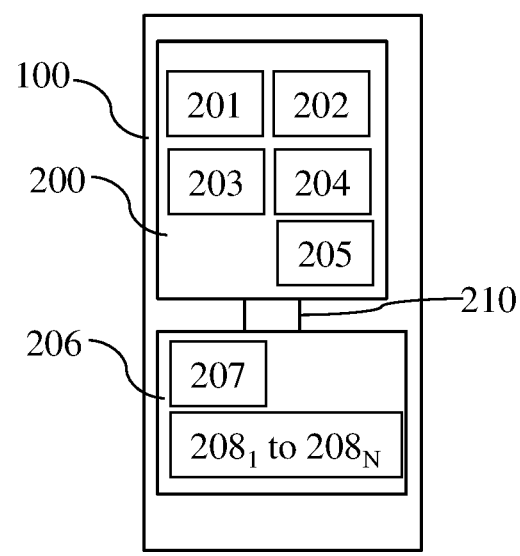
FIG. 2a depicts a first example of architecture of a master communication module of the communication system for the control and monitoring of peripherals according to the present invention.

FIG. 2a depicts a first example of architecture of a master communication module of the communication system for controlling and monitoring peripherals according to the present invention.

The master communication module 100 is broken down into a first part 200 and a second part 206 both connected by an internal port 210.

The first part 200 comprises a module 201 for forming the data frames transmitted and processing the data frames received, an interface 202 to separate devices, distant or not, sending the data to be transmitted and/or receiving the data received, a connection-management module 203, which, from a table 204, determines the port and the connection that have to be selected for receiving the data frames from the slave communication modules, from a management module 205 of a cycle counter and from an elementary-cycle counter.

For transmitting data frames to the slave communication modules 120, the first part 200 transmits these at a predetermined rate in predetermined time periods.

A cycle is broken down into a plurality of elementary cycles, for example of predetermined duration and identical for a given configuration, known to the master communication module 100 and the slave communication modules 120, equal to 8, 10 or 12 microseconds.

In an elementary cycle, a single data frame is transmitted by the first part 200.

A cycle is for example composed of 16 elementary cycles.

The cycle counter is for example an 8- or 12-bit counter and is incremented at each cycle.

The elementary-cycle counter is for example a 4-bit counter and is incremented every 8, 10 or 12 microseconds.

When a data frame is transmitted, the value of the cycle counter and the value of the elementary-cycle counter are inserted in the data frame with the data destined for a slave communication module.

The data frame comprises an identifier of the destination slave communication module and is transmitted to the second part of the master communication module 100, which broadcasts the data frame through each of the ports $208_1$ to $208_N$.

For receiving data transmitted by the slave communication modules 120, the first part 200 of the master communication module 100 selects the identifier of a slave communication module that corresponds to the index of the table comprising time-period indices that is equal to the value of the elementary-cycle counter. Each time-period index is associated with an identifier of a slave communication module.

The first part 200 controls the second part 206 so that the latter selects the port of the second part of the master communication module 100 that is connected to the slave communication module the identifier of which is selected.

The second part 206 comprises a selector 207 that, on command from the first part 200, directs a data frame received from a port $208_1$ to $208_N$ to the port 210.

The second part 206 transmits the frames received from the port 210 to each port to which the slave communication module 120 is connected.

Figure 2B:
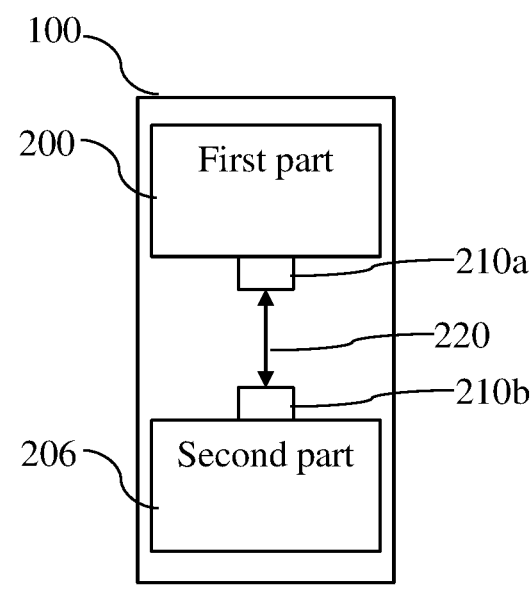
FIG. 2b depicts a second example of architecture of a master communication module of the communication system for the control and monitoring of peripherals according to the present invention.

FIG. 2b depicts a second example of architecture of a master communication module of the communication system for controlling and monitoring peripherals according to the present invention.

In the second example of architecture of a master communication module 100, the master communication module 100 is broken down into a first part 200 and a second part 206 connected by an Ethernet connection 220 and two ports 210a and 210b.

The first and second parts of the master communication module 100 can thus be placed at various points on the aircraft.

The first and second parts 200 and 206 have an internal structure similar to that described with reference to FIG. 2a except that, instead of being included in the first part 200, the connection-management module 203, the management module 205 of a cycle counter and of an elementary-cycle counter and the table 204 are included in the second part 206.

Figure 3:
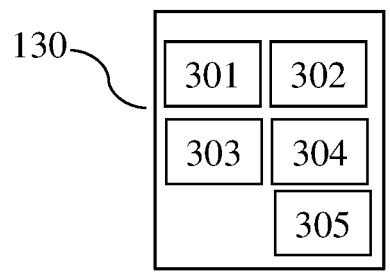
FIG. 3 depicts an example of architecture of a slave communication module of the communication system for the control and monitoring of peripherals according to the present invention.

FIG. 3 depicts an example of architecture of a slave communication module of the communication system for controlling and monitoring peripherals according to the present invention.

The slave communication module 120 comprises a module 301 for forming data frames to be transmitted and for processing the data frames received, from an interface 302 to the power module 130, and a connection-management module 303 that, from a table 304, determines the time periods in which the slave communication module 120 must transmit data frames, from a management module 305 of a cycle counter and of an elementary-cycle counter that are updated with the values of the cycle counters and elementary-cycle counters included in the data frames received.

FIG. 4a depicts a first example of a timing diagram for the transmission of frames by the master communication module and slave communication modules.

FIG. 4a depicts two frame-transmission cycles denoted MRCL1 and MRCL2, the value of which corresponds to that of the cycle counter. In the example in FIG. 4a, a transmission cycle is broken down into M=6 elementary cycles for reasons of simplicity. It should be noted here that the number M of elementary cycles is often different from the number N of slave communication modules.

For each elementary cycle in which a data frame must be transmitted by a slave communication module 120, the table 204 comprises the identifier of the single slave communication module 120 that is to transmit the data frame in the elementary cycle.

The tables 204 and 304 are for example identical.

In a variant, each slave communication module 120 stores a table that comprises, only for the elementary cycle or cycles in which the slave communication module 120 must send a data frame or in which the slave communication module 120 that is connected thereto must send a data frame, the identifier of the slave communication module that is to send a data frame.

According to the example in FIG. 4a, in each elementary cycle $EC_1$ to $EC_M$, the master communication module 100 transmits a data frame that is received by each slave communication module $120_1$ to $120_N$.

In the elementary cycles $EC_1$ of the cycles $MRCL_1$ and $MRCL_2$, the slave communication module $120_2$ transmits a data frame to the master communication module 100 in accordance with the table 304.

In the elementary cycles $EC_2$ of the cycles $MRCL_1$ and $MRCL_2$, the slave communication module $120_1$ transmits a data frame to the master communication module 100 in accordance with the table 304.

In the elementary cycles $EC_{M-1}$ of the cycles $MRCL_1$ and $MRCL_2$, the slave communication module $120_{N-1}$ transmits a data frame to the master communication module 100 in accordance with the table 304.

In the elementary cycles $EC_M$ of the cycles $MRCL_1$ and $MRCL_2$, the slave communication module $120_N$ transmits a data frame to the master communication module 100 in accordance with the table 304.

FIG. 4b depicts a second example of a timing diagram for the transmission of data frames by the master communication module and the slave communication modules.

FIG. 4b depicts two frame transmission cycles denoted MRCL1 and MRCL2, the value of which corresponds to that of the cycle counter. In the example in FIG. 4b, a transmission cycle is broken down into M=6 elementary cycles for reasons of simplicity.

It should be noted here that the number M of elementary cycles is very often different from the number N of slave communication modules.

For each elementary cycle in which a data frame must be transmitted by a slave communication module 120, the table 204 comprises the identifier of the single slave communication module 120 that is to transmit the data frame in the elementary cycle.

Tables 204 and 304 are for example identical.

In a variant, each slave communication module 120 stores a table that comprises, only for the elementary cycle or cycles in which the slave communication module 120 is to send a data frame or in which the slave communication module 120 that is connected thereto is to send a data frame, the identifier of the slave communication module that is to send a data frame.

In the elementary cycles $EC_1$ to $EC_{M-1}$, the master communication module 100 transmits a data frame that is received by each slave communication module $120_1$ to $120_N$.

In the example in FIG. 4b, the master communication module 100 inserts, in the data frame transmitted in the elementary cycle $EC_3$ of the cycle $MRCL_2$, information identifying the slave communication module $120_1$ and identifying an elementary cycle in which the slave communication module $120_1$ is to transmit a data frame and indicating that the slave communication module $120_{N-1}$ previously associated with the elementary cycle $EC_{M-2}$ of the cycle $MRCL_2$ must derogate to the table 304 and not transmit a data frame in the elementary cycle $EC_{M-2}$ of the cycle $MRCL_2$.

In the elementary cycles $EC_1$ of the cycles $MRCL_1$ and $MRCL_2$, the slave communication module $120_1$ transmits a data frame to the master communication module 100 in accordance with the table 304 and, in the elementary cycle $EC_{M-2}$ of the cycle $MRCL_2$, the slave communication module $120_1$ transmits a data frame to the master communication module 100 in accordance with the data frame received in the elementary cycle $EC_3$ of the cycle $MRCL_2$.

In the elementary cycles $EC_3$ of the cycles $MRCL_1$ and $MRCL_2$, the slave communication module $120_2$ transmits a data frame to the master communication module 100 in accordance with the table 304.

In the elementary cycle $EC_{M-2}$ of the cycle $MRCL_1$, the slave communication module $120_{N-1}$ transmits a data frame to the master communication module 100 in accordance with the table 304 and, in the elementary cycle $EC_{M-2}$ of the cycle $MRCL_2$, the slave communication module $120_{N-1}$ does not transmit a data frame to the master communication module 100 in accordance with the frame received in the elementary cycle $EC_3$ of the cycle $MRCL_2$.

In the elementary cycles $EC_M$ of the cycles $MRCL_1$ and $MRCL_2$, the slave communication module $120_N$ transmits a data frame to the master communication module 100 in accordance with the table 304.

Figure 5:
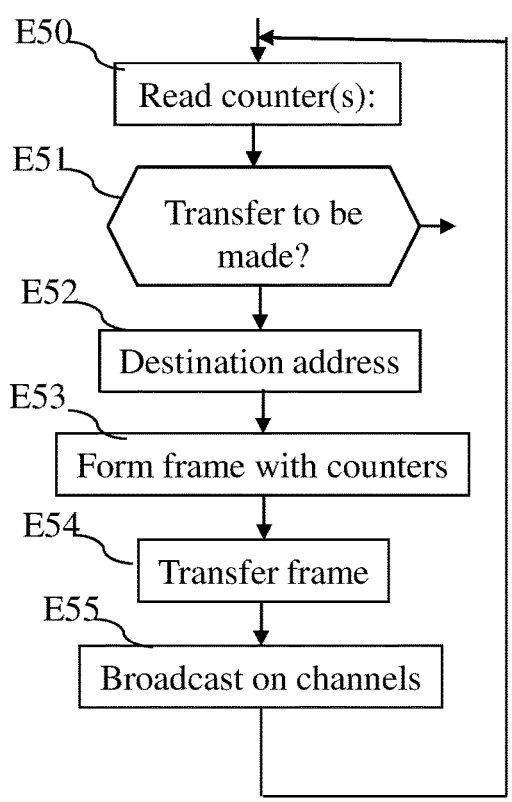
FIG. 5 depicts an example of an algorithm executed by the master communication module for the transmission of data frames according to the present invention.

FIG. 5 depicts an algorithm executed by the master communication module for transmitting data frames in accordance with the present invention.

At step E50, the first part of the master communication module 100 reads at least the value of the elementary-cycle counter and optionally the value of the cycle counter.

The elementary-cycle counter is incremented by one unit at each new time period and the cycle counter is incremented at each cycle end.

At step E51, the first part of the master communication module 100 checks whether a data-frame transfer must be made in a time period. Periodically, for example every 8 or 10 or 12 microseconds and in a time period of the same duration, a data frame may be transferred by the master communication module 100 according to the content of the table 204.

If a data-frame transfer must be made, the first part of the master communication module 100 passes to step E52. If not, the first part of the master communication module 100 returns to step E50 awaiting a new time period.

At step E52, the first part of the master communication module 100 obtains information identifying the slave communication module 120 for which the data frame to be transmitted is intended.

At step E53, the first part of the master communication module 100 forms a data frame comprising at least the value of the elementary-cycle counter, the identifier of the slave communication module 120 for which the data frame is intended. The data frame may comprise, in addition to the commands intended for the peripheral connected to the destination slave communication module 120, the value of the cycle counter.

At step E54, the first part of the master communication module 100 transfers the data frame formed to the second part of the master communication module 100.

At step E55, the second part of the master communication module 100 transfers the data frame to each slave communication module 120.

Figure 6:
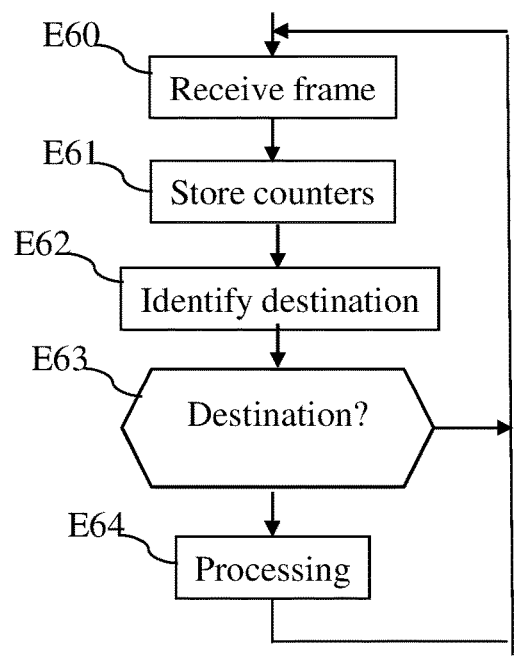
FIG. 6 depicts an example of an algorithm executed by each slave communication module for the reception of data frames according to the present invention.

FIG. 6 depicts an algorithm executed by each slave communication module for the reception of data frames according to the present invention.

At step E60, each slave communication module 120 receives a data frame.

At step E61, each slave communication module 120 stores at least the value of the elementary-cycle counter included in the frame and the value of the cycle counter if this is present in the data frame. Each slave communication module 120 adjusts its time reference for local management of the elementary-cycle and cycle counters as from the correct reception of each data frame issuing from the master communication module 100 so as to maintain the synchronisation between the performance of the cycles carried out at the slave communication module 120 and the performance of the cycles carried out at the master communication module 100, by virtue of the broadcasting of each of the data frames carried out by the second part of the master communication module 100.

A step E62, each slave communication module 120 reads the identifier of the slave communication module 120 in the data frame received.

If one or more slave communication modules are connected to the slave communication module 120, the slave communication module 120, at this same step, systematically transfers the data frame to the slave communication module or modules that are connected thereto.

At step E63, each slave communication module 120 checks whether it is the addressee of the data frame by comparing the identifier included in the data frame with its identifier.

If the slave communication module 120 has the same identifier as the one included in the frame received, the slave communication module 120 passes to step E64. If not, the slave communication module 120 returns to step E60, awaiting a new data frame.

At step E64, the slave communication module 120 processes the data of the data frame if it has the same identifier as the one included in the frame received and transfers commands to the power module 130.

Figure 7:
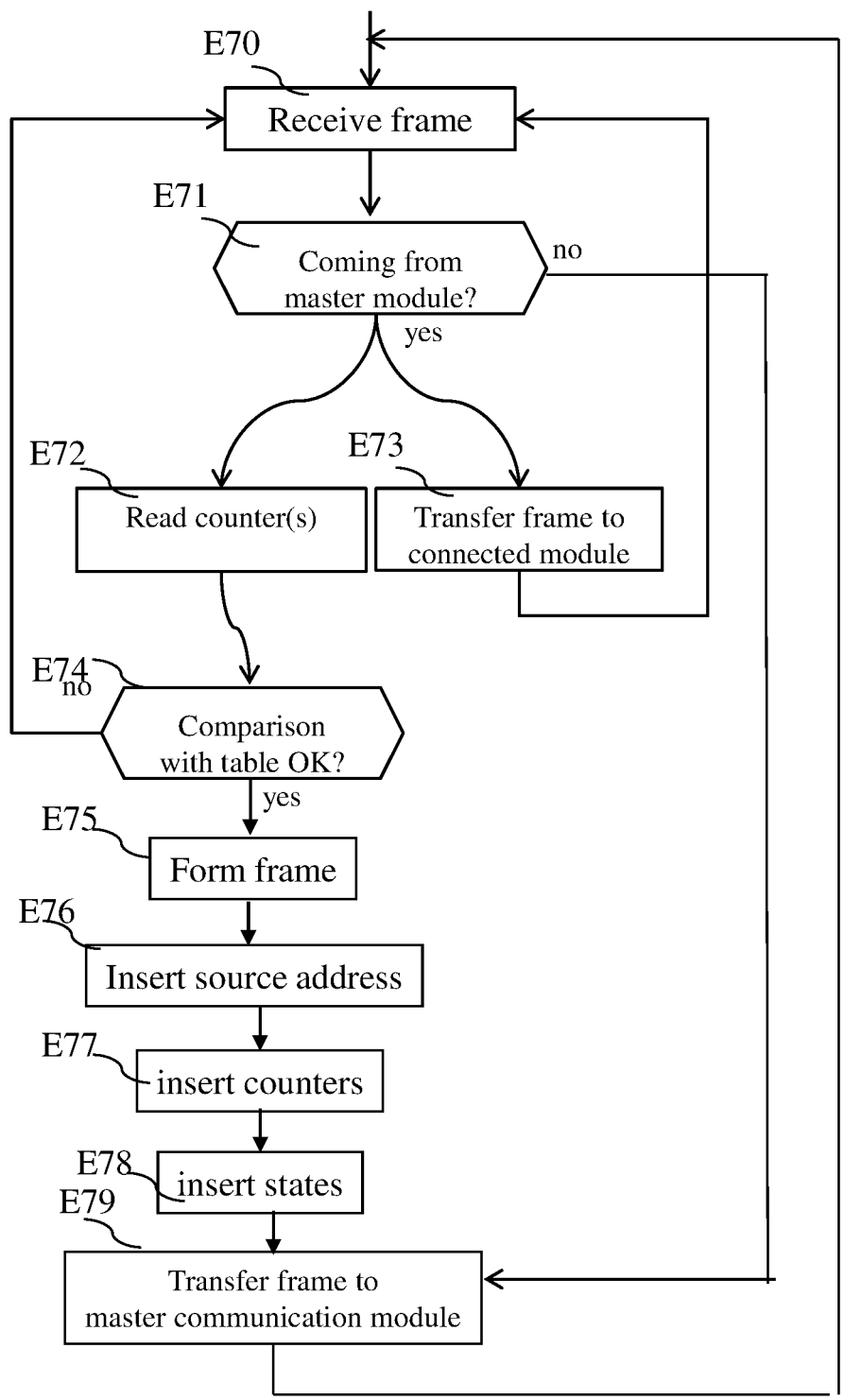
FIG. 7 depicts an example of an algorithm executed by each slave communication module for the transmission of data frames according to the present invention.

FIG. 7 depicts an algorithm executed by each slave communication module for transmitting data frames according to the present invention.

At step E70, each slave communication module 120 receives a data frame.

At step E71, each slave communication module 120 determines the origin of the data frame according to the port by which the data frame is received.

If the data frame is sent by the master communication module 100, the algorithm passes to step E72 and to step E73.

If the data frame is sent by a slave communication module 120 that is connected to it, the algorithm passes to step E79.

At step E72, each slave communication module 120 reads the value of the elementary-cycle counter and optionally the value of the cycle counter included in the data frame and passes to step E74.

At step E73, each slave communication module 120 transfers the data frame received to each slave communication module if there is one, and returns to step E70 awaiting a data frame.

At step E74, each slave communication module 120 checks whether the value of the counter read corresponds to a time-period index associated with the slave communication module 120.

The time-period index is for example included in a table identical to the one stored by the master communication module 100.

If the value of the counter read corresponds to a time-period index associated with the slave communication module 120, the slave communication module 120 passes to step E75. If not, the slave communication module 120 returns to step E70, awaiting a data frame.

At step E75, the slave communication module forms a data frame.

At the optional step E76, the slave communication module 120 inserts its identifier in the data frame.

At step E77, the slave communication module 120 inserts, in the data frame, the value of the elementary-cycle counter and optionally the value of the cycle counter.

At step E78, the slave communication module 120 inserts, in the data frame, the data supplied by the peripheral with for example: the measurements of positions, the measurements of currents and voltages and the data relating to the state of the peripheral and the data relating to the state of the slave communication module, such as for example data on a synthesis of the global state, on the operating temperature, the number of frames for which a check on cycle coherence was negative, and the number of frames for which an integrity check was negative.

At step E79, the slave communication module 120 transfers, to the master communication module, the data frame obtained at the end of step E78 or transfers the data received from a slave communication module that is connected to it.

Once this operation has been performed, the slave communication module 120 returns to step E70.

Figure 8:
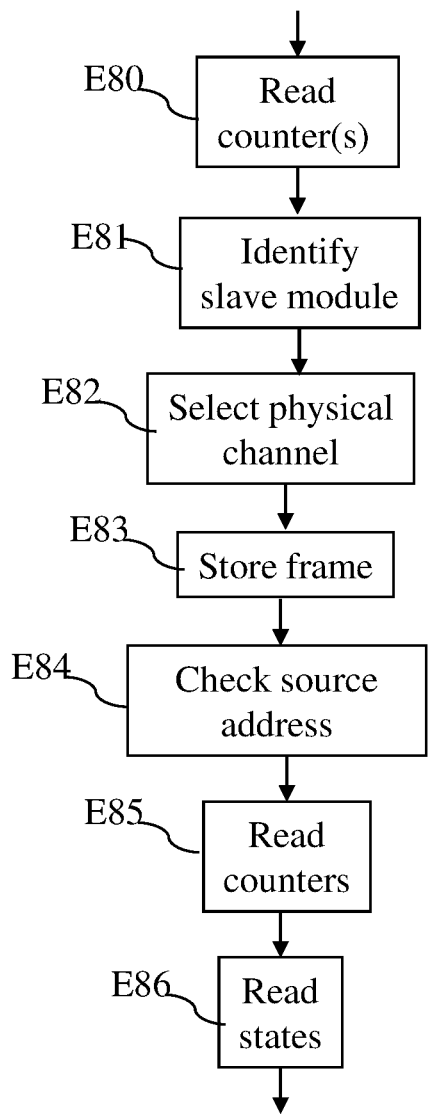
FIG. 8 depicts an example of an algorithm executed by the master communication module for the reception of data frames according to the present invention.

FIG. 8 depicts an algorithm executed by the master communication module for receiving data frames according to the present invention.

At step E80, the first part of the master communication module 100 reads the value of the elementary-cycle counter and optionally the value of the cycle counter.

At step E81, the first part of the master communication module 100 identifies, from the table 204, the slave communication module 120 that is to send a data frame in the time period corresponding to the value of the elementary-cycle counter.

At step E82, the first part of the master communication module 100 instructs the second part of the master communication module 100 so that the latter enables the reception of a data frame on the port to which the slave communication module 120 identified is connected and effects the transfer thereof to the port 210 or 210b/210a if the reception of this data frame coming from the slave communication module 120 predefined for this elementary-cycle value is correct.

At step E83, the data frame received is stored at a location of the master communication module 100 explicitly associated with this elementary cycle.

At step E84, which is optional, the first part of the master communication module 100 checks whether the identifier included in the data frame received corresponds to that of the slave communication module 120 that is to send a data frame in the time period.

At step E85, the first part of the master communication module 100 reads the value of the elementary-cycle counter and optionally the value of the cycle counter included in the data frame in order to check whether this corresponds to the one or ones read at step E80.

At step E86, the first part of the master communication module 100 reads, in the data frame, data relating to the state of the peripheral, such as for example the synthesis of the global state, data on the operating temperature, the number of frames for which a cycle coherence check has been negative, and the number of frames for which an integrity check has been negative.

Once this operation has been performed, the first part of the master communication module 100 returns to step E80 awaiting a new time period.

Naturally the present invention is in no way limited to the embodiments described here but quite the contrary encompasses any variant within the capability of a person skilled in the art.

The invention claimed is:

1. A communication system for controlling and monitoring at least one peripheral in an aircraft, the system comprising a master communication module connected to at least one separate slave communication module, distant or not from the master communication module, the or each slave communication module being disposed in a vicinity of a controlled peripheral and being connected to a port of the master communication module by a bidirectional link, wherein the system comprises:
   a counter included in the master communication module,
   a table, included in the master communication module, the table comprising time-period indices, each time-period index being associated or not with an identifier of a slave communication module,
   circuitry, included in the master communication module, causing master communication module to transmit data frames to the or each slave communication module in a plurality of time periods, each data frame comprising a value of the counter,
   circuitry, included in the or each slave communication module, causing the slave communication module to receive the data frames,
   circuitry, included in the or each slave communication module, causing the slave communication module to read the value of the counter included in the data frame received, and for updating a counter included in the or each slave communication module with the read value of the counter included in the data frame received,
   circuitry, included in the or each slave communication module, causing the slave communication module to check whether the value of the counter updated corresponds to a time-period index associated with the slave communication module,
   circuitry, included in the or each slave communication module, causing the slave communication module to transfer a data frame to the master communication module if the value of the counter read and stored corresponds to a time-period index associated with the slave communication module,
   circuitry, included in the master communication module, causing the master communication module to select the port connecting the master communication module to the slave communication module the identifier of which is associated with the time-period index that corresponds to the value of the counter, circuitry, included in the master communication module, causing the master communication module to receive the data frame transmitted by the slave communication module.

2. The system according to claim 1, wherein the master communication module is connected to a plurality of slave communication modules, the port and the bidirectional link connecting each slave communication module to the master communication module being different from the port and the bidirectional link connecting each other slave communication module to the master communication module.

3. The system according to claim 1, wherein at least two slave communication modules are connected to the master communication module and at least one slave communication module is connected to the master communication module via another slave communication module and the port and the bidirectional link connecting the other slave communication module to the master communication module.

4. The system according to claim 3, wherein the other slave communication module comprises circuitry for transmitting the data frame to the slave communication module that is connected to it.

5. The system according to claim 1, wherein the system further comprises a supervision module that stores each data frame transmitted by the master communication module and by each slave communication module.

6. The system according to claim 5, wherein the supervision module receives each data frame from the master communication module.

7. The system according to claim 5, wherein the supervision module receives from the master communication module each data frame transmitted by the master communication module to the or each slave communication module and receives each data frame transmitted by each slave communication module to the master communication module of the slave communication modules.

8. The system according to claim 1, wherein the master communication module is broken down into two parts, each part comprising a port connecting them together.

9. The system according to claim 8, wherein the two parts are placed at different points and the ports are connected by a link.

10. A communication method for controlling and monitoring at least one peripheral in an aircraft using a system, the system comprising a master communication module connected to the or each separate slave communication module, distant or not from the master communication module, the or each slave communication module being disposed in a vicinity of a controlled peripheral and being connected to a port of the master communication module by a bidirectional link, wherein said method causes the system to perform:

sending, by the master communication module, of data frames to the or each slave communication module in a plurality of time periods, each data frame comprising a value of a counter included in the master communication module, receiving of the data frames by the or each slave communication module, reading, by the or each slave communication module, of the value of the counter included in the data frame received, and the updating, by the or each slave communication module, of a counter included in the or each slave communication module with the read value of the counter included in the data frame received, checking, by the or each slave communication module, whether the value of the counter updated corresponds to a time-period index associated with the slave communication module, transferring of a data frame by the or each slave communication module to the master communication module if the value of the counter read and stored corresponds to a time-period index associated with the slave communication module, selecting, by the master communication module, from a table, included in the master communication module, comprising time-period indices, each time-period index being associated or not with an identifier of a slave communication module, of the port connecting the master communication module to the slave communication module the identifier of which is associated with the time-period index that corresponds to the value of the counter.

* * * * *